Nov. 8, 1966   H. H. CLINTON   3,284,707
CIRCUIT CONTINUITY OR RESISTANCE TESTER HAVING
AN AUDIBLE OUTPUT SIGNAL
Filed July 30, 1963

INVENTOR.
HENRY H. CLINTON
BY
McCormick, Paulding & Huber
ATTORNEYS

United States Patent Office 3,284,707
Patented Nov. 8, 1966

3,284,707
CIRCUIT CONTINUITY OR RESISTANCE TESTER HAVING AN AUDIBLE OUTPUT SIGNAL
Henry H. Clinton, Ridgewood, Clinton, Conn.
Filed July 30, 1963, Ser. No. 298,722
3 Claims. (Cl. 324—62)

This invention relates to instruments for testing the continuity or resistance of an electrical circuit or circuit component, and deals more particularly with such an instrument having an audible output signal which varies with variations in the measured resistance and from which the user can determine the continuity or approximate resistance of the measured circuit.

The most common method for testing the continuity of circuits or for measuring the resistance of circuits or circuit components is to use an ohmmeter of various different conventional constructions having a needle which is moved across a fixed scale, the deflection of the needle being related to the measured resistance. This method is generally quite accurate, but has the disadvantage of requiring the user to look away from the terminals across which the resistance is being measured to observe the meter indication. It also has the additional disadvantage of having a relatively slow response since some time must be allowed for the needle to reach a final or steady position as each measurement is made with the result that a large number of terminals cannot be tested rapidly in searching for one particular circuit, as for example in searching for one open circuit among many other closed circuits.

Another conventional method for determining circuit continuity involves the impressing of an audio voltage between the conductor under test and ground or between two conductors. A headphone or other detecting device sensitive to the audio voltage is then used to identify the conductor or conductors at some other appearance. Similarly, if the conductors are identified, the presence or absence of the audio voltage at the other appearance may be used to signify the absence or presence of a closed circuit between the point at which the audio voltage is impressed and the test point. This method has the advantage of being rapid and using low current, but it gives no indication of the circuit resistance. It can also be used only in certain applications where there are no shunting impedances between the circuits and where a determination of the approximate circuit resistance is not important. It is also subject to error because the A.C. audio voltage can be coupled by capacitive or inductive action into other circuits.

A third type of continuity tester involves a simple battery-buzzer combination. This device necessitates a large current in the test circuit in order to operate the buzzer, and this large current in many instances may destroy diodes, transistors or other circuit components included in the test circuit. In addition, any appreciable resistance in the test circuit will cause the buzzer to cease functioning.

The general object of this invention is therefore to provide a circuit continuity or resistance tester which operates instantaneously to provide an audible signal from which signal the user may determine the continuity or approximate resistance of the circuit or component under test.

A further object of this invention is to provide a circuit continuity or resistance tester of the type mentioned in the last paragraph, which tester is of very simple and low-cost construction and which may be made very small in size so as to be adaptable for use as a portable or hand-held device.

A still further object of this invention is to provide a circuit continuity or resistance tester of the foregoing character wherein the currents applied to the test circuits or components are very small so as to avoid the danger of damage to components incapable of handling large currents.

Another object of this invention is to provide a circuit continuity or resistance tester of the foregoing character which includes a means for providing a distinctive sound when the tester is turned on but not in actual use, thereby avoiding battery rundown by reminding the user to turn the device off.

Another object of the invention is to provide a circuit continuity or resistance tester of the foregoing character which is capable of discriminating between various low resistances, as for example resistances in the range of 0–50 ohms, and which therefore is capable of discriminating between wire resistance and the resistance of diodes, transistors, and other components which may shunt the resistance under test.

A still further object of this invention is to provide a circuit continuity or resistance tester of the foregoing character which is selectively operable to adapt the same for use with various different ranges of test resistances.

Other objects and advantages of the invention will be apparent from the following description and from the drawing forming a part hereof.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
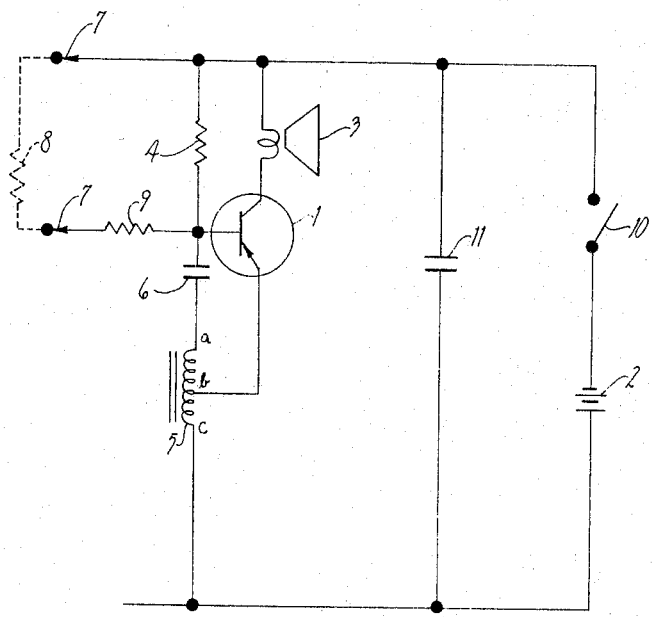
FIG. 1 is a schematic wiring diagram of a circuit continuity or resistance tester embodying the present invention.

Turning to the drawing and first considering FIG. 1, this figure illustrates a circuit continuity or resistance tester made in accordance with the present invention. This tester is basically an audio oscillator, the oscillation frequency or pitch of which various inversely with the resistance of the test circuit or component and the output of which operates a loudspeaker, headphone or other similar electro-mechanical transducer for producing an audible output signal. A user of this device can by listening to the tone produced by the loudspeaker or other transducer determine the continuity or approximate resistance of the test circuit instantaneously and without removing his eyes from the test probes or terminals.

The device of FIG. 1 includes a PNP transistor 1 having base, emitter and collector terminals and is powered by a battery 2. The collector and emitter terminals of the transistor are connected across the opposite sides of the battery 2 by an emitter-collector circuit which includes the coil of an electro-mechanical transducer 3, such as a loudspeaker, for converting oscillating currents produced in the emitter-collector circuit into audible sounds having a tone related to the frequency of the latter current. Forward bias current is supplied to the base terminal of the transistor by a resistor 4 connected between the negative side of the battery 2 and the base terminal. Regenerative feedback is also provided from the emitter-collector circuit to the base terminal by a transformer having a primary winding forming part of the emitter-collector circuit and a secondary winding inductively coupled with the primary winding. In the illustrated case, this transformer is in the form of an autotransformer 5 having a single winding with a tap, indicated at $b$, connected to the emitter terminal of the transistor. One end $c$ of the transformer winding is connected to the positive side of the battery 2 and the other end $a$ is connected through a capacitor 6 to the base terminal of the transistor. The portion of the winding between the tap $b$ and the end $c$ therefore forms the primary winding of the transformer and the entire length of the winding between the ends $a$ and $c$ form the secondary winding.

Also provided in the device are two test probes or conductors 7, 7, or similar means, having free ends for respectively contacting two points on an external circuit or component which in the illustrated case is shown by the broken lines to comprise a resistance 8. One test probe 7 is connected to the negative side of the battery 2 and the other test probe 7 is connected through a resistor 9 to the base terminal of the transistor. The two test probes 7, 7 when placed across the external resistance 8 therefore complete a circuit paralleling the bias resistor 4.

From the foregoing it will be understood that the arrangement of the various components is such that the transistor 1 will operate as a blocking oscillator to produce oscillating current in the emitter-collector circuit, and it will also be obvious that the frequency of the oscillations will be dependent on the effective bias resistance which is comprised of the bias resistor 4 in parallel with the circuit completed by the test probes 7, 7. Preferably, the amount of feed-back provided by the transformer 5 and the value of the resistors 4 and 9 and the capacitor 6 are so chosen that the current in the emitter-collector circuit will oscillate at an audio rate, preferably within the range of 1 to 600 pulses or oscillations per second for any resistance under test, the particular frequency produced within this range being dependent on the particular value of the resistance under test. This oscillating current operates the coil of the transducer 3 causing the latter to emit a tone which is related to the frequency of the current. More particularly, it is preferred that the resistance 4 be selected so that a low pulse rate, for instance 1 per second, is obtained when the test resistance 8 is infinite. This low pulse rate produces a distinctive ticking sound from the transducer and indicates to the operator that the device is turned on, thereby warning the operator to turn off the device to prevent the possibility of accidental battery run-down. In order to allow the device to be turned on and off at will, a manually operable switch 10 is provided in the battery circuit as shown. It is also preferred to provide a by-pass capacitor, as illustrated at 11, connected across the battery to reduce the impedance of the battery to the flow of current pulses during operation of the device.

In addition to choosing the value of the resistor 4 to produce ticking sounds as a result of an infinite test resistance, it is also preferred that the resistor 9 be chosen to produce a predetermined maximum audio pulse rate, for instance 600 cycles per second, when the resistance under test is zero. If the values of the resistors 4 and 9 are so chosen, other values of the test resistance 8 between zero and infinity will cause audio tones to be produced by the transducer intermediate the two limiting rates of one cycle per second and 600 cycles per second, and as a result, the user of the device will be able to audibly distinguish between the values of different test resistances by the tone produced from the transducer.

Figure 2:
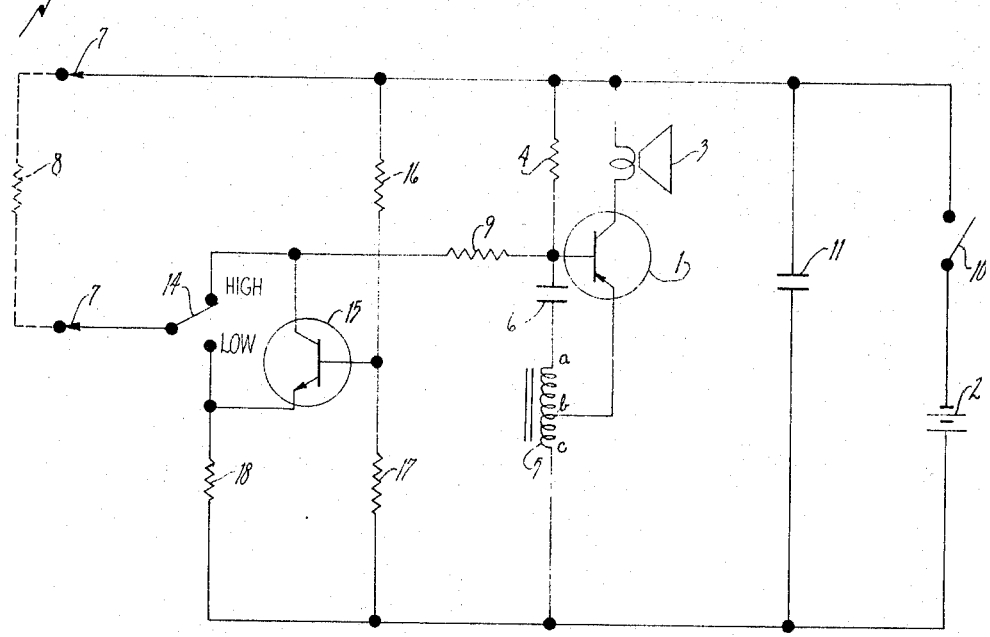
FIG. 2 is a schematic wiring diagram of a circuit continuity or resistance tester comprising another embodiment of the present invention.

FIG. 2 illustrates another embodiment of the invention which includes an additional circuit for enabling the device to be used for discriminating among low resistance values, as for example resistances falling within a range of zero to 50 ohms. In the device of FIG. 2, a selector switch 14 is provided for selectively conditioning the device for use with high or low values of test resistances. When the selector switch 14 is in the HIGH position as shown, the active circuit is exactly identical with that of FIG. 1. When the selector switch is moved to the LOW position, a second transistor 15, in this case an NPN transistor, is so connected with the base terminal of the first transistor 1 as to provide an alternate discharge path for the capacitor 6 extending through the emitter-collector terminals of the second transistor 15 with the resistance between said latter terminals being controlled by the value of the test resistance 8. As shown, the transistor 15 has its base terminal connected to an intermediate point of a voltage divider comprised of two resistances 16 and 17 connected in series across the opposite sides of the battery 2. The emitter terminal of the transistor 15 is in turn connected to the positive side of the battery through a resistor 18. One of the probes 7 is connected to the moving contact of the switch 14 and the probe 7 is connected to the negative side of the battery.

From FIG. 2 it will be noted that when the switch 14 is in its LOW position, the unknown or test resistance 8 and the resistance 18 constitute a second voltage divider. By choosing the value of the resistor 18 properly, the resistance of the external circuit 8 required to cause the transistor 15 to draw collector current may be made quite low, as for example 50 ohms. Then as the test resistance 8 decreases from 50 ohms toward zero ohms, the collector current of the transistor 15 increases (that is, the resistance between the emitter-collector terminals is decreased) to reduce the discharge time of the capacitor 6 and thus increasing the frequency of the oscillating current in the emitter-collector circuit of the transistor 1.

By using the second transistor 15 the current passed through the resistance 8 under test need be only a few milliamperes and is therefore not destructive to delicate components which may shunt or be otherwise connected with the test resistance. An important advantage of this is that the corresponding voltage drop across the test resistance is only a few tenths of a volt and at this voltage the resistances of most silicon and germanium diodes and transistors are high relative to 10 ohms. Few other circuit components have resistances of less than 10 ohms which is a value easily distinguished by the present device from the usual wiring resistance afforded by a relatively short cable or conductor. As a consequence, the continuity of wires containing complicated circuits can be checked without error due to the shunting effects of diodes and other components.

The invention claimed is:

1. A continuity or resistance testing device comprising a battery, a transistor having base and emitter and collector terminals, an emitter-collector circuit connecting said emitter and collector terminals across the opposite sides of said battery, a bias resistor connected between one side of said battery and said base terminal, a transformer having a primary winding forming part of said emitter-collector circuit and a secondary winding inductively coupled with said primary winding, a regenerative feed-back circuit including a capacitor in series with said secondary winding connected between said base and emitter terminals for causing operation of said transistor as a blocking oscillator to produce an oscillating current in said emitter-collector circuit, an electro-mechanical transducer coupled with said emitter-collector circuit for converting said oscillating current to an audible sound having a tone related to the frequency of said oscillating current, a second transistor having emitter and collector and base terminals, a circuit connected between the base terminal of said first transistor and the other side of said battery and passing through said emitter and collector terminals of said second transistor, a voltage divider circuit connected across said battery and connected at an intermediate point to the base terminal of said second transistor, a resistor connected between said emitter terminal of said second transistor and one side of said battery, a first probe connected with said emitter terminal of said second transistor, and a second probe connected to the side of said battery other than that to which said latter resistor is connected so that when said probes are placed across an external resistance said external resistance and said latter resistor form a voltage divider circuit connected with said emitter terminal of said second transistor and across said battery.

2. A continuity or resistance testing device comprising a battery, a transistor having base and emitter and collector terminals, an emitter-collector circuit connecting said emitter and collector terminals across the opposite sides of said battery, a bias resistor connected between one side of said battery and said base terminal, a transformer having a primary winding forming part of said emitter-collector circuit and a secondary winding inductively coupled with said primary winding, a regenerative feed-back circuit including a capacitor in series with said secondary winding connected between said base and emitter terminals for causing operation of said transistor as a blocking oscillator to produce an oscillating current in said emitter-collector circuit, an electro-mechanical transducer coupled with said emitter-collector circuit for converting said oscillating current to an audible sound having a tone related to the frequency of said oscillating current, a second transistor having emitter and collector and base terminals, a circuit connected between the base terminal of said first transistor and the other side of said battery and passing through said emitter and collector terminals of said second transistor, a voltage divider circuit connected across said battery and connected at an intermediate point to the base terminal of said second transistor, a resistor connected between said emitter terminal of said second transistor and one side of said battery, a first test probe connected to the side of said battery other than that to which said latter resistor is connected, a second test probe, and a selector switch for selectively connecting said second test probe with either the base terminal of said first transistor or the emitter terminal of said second transistor.

3. A continuity or resistance testing device comprising a battery-powered blocking oscillator having a first resistor and a capacitor the discharge time of which controls the frequency of the oscillating output current of said oscillator, an electromechanical transducer driven by the oscillating output current of said oscillator for producing an audible sound having a tone related to the frequency of said output current, said first resistor being part of a first discharge circuit for said capacitor, means providing a second discharge circuit for said capacitor and including a transistor, and a biasing circuit for said transistor for varying the resistance of said transistor in said second discharge circuit, said biasing circuit having two points the resistance between which two points controls the resistance of said transistor in said second discharge circuit, and means including a selector switch for selectively connecting an external test circuit either across said two points or in parallel with said first resistor.

References Cited by the Examiner
UNITED STATES PATENTS

| | | | |
|---|---|---|---|
| 1,649,753 | 11/1927 | Strauss et al. | 324—62 X |
| 2,395,368 | 2/1946 | Bull | 331—65 X |
| 2,555,368 | 6/1951 | Philpott | 331—146 X |
| 2,904,755 | 9/1959 | Foley | 331—112 |
| 2,918,054 | 12/1959 | Godkasian | 324—62 X |
| 2,946,949 | 7/1960 | Dopheide | 324—51 |
| 2,977,418 | 3/1961 | Haas | 331—112 X |
| 3,025,858 | 3/1962 | Browner | 331—112 X |
| 3,051,944 | 8/1962 | Smith. | |
| 3,056,930 | 10/1962 | Berg | 331—112 X |

FOREIGN PATENTS 1,188,263　3/1959　France.

OTHER REFERENCES

Louis: Radio and Television News, "A Transistorized Pulse Generator," January 1956, pp. 64, 65, 124 and 125.

Queen: Radio-Electronics, "Wide-Range Transistorized Bridge," vol. 26, March 1955, pp. 106, 108, 110.

WALTER L. CARLSON, *Primary Examiner.*

E. E. KUBASIEWICZ, *Assistant Examiner.*